3,008,573
ELECTROSTATIC SEPARATION PROCESS
John H. Gross and John J. Sholine, Lakeland, Fla., assignors to International Minerals & Chemical Corporation, a corporation of New York
No Drawing. Filed Mar. 31, 1960, Ser. No. 18,848
18 Claims. (Cl. 209—9)

This invention relates to the electrostatic separation of mixtures containing inorganic sodium and potassium halides and sulfates. More particularly, the invention relates to a method of electrostatically separating mixtures, including comminuted potash ores, containing sodium chloride or sulfate and potassium chloride or sulfate particles, at least a portion of the surfaces of which have been modified by treatment with ammonia.

It is known to electrostatically beneficiate potash ores and separate mixtures of particulate sodium and potassium chlorides such as may be produced by the evaporation of natural and artificial brines. One such procedure, described in Lawver Patent 2,805,768, entails heating a mixture of particulate sodium and potassium chloride to an elevated temperature, inducing the heated particles to accept differential charges and thereafter passing the charged particles, while at an elevated temperature, through an electrostatic field.

The literature also suggests that selectivity in certain electrostatic separations may be enhanced by preconditioning the surfaces of the particles to be separated with certain chemical reagents or coating materials. One such disclosure is found in the article by Fraas et al. entitled "Electrostatic Separations of Solids," Ind. and Eng. Chem., 32, pp. 600 to 604.

In regard to the electrostatic separation of potash materials, the Fraas et al. article refers only to the selective filming with oil of the potassium chloride component of a potassium chloride-sodium chloride mixture whereby the conductivity of the potassium chloride is significantly reduced and the efficiency of a conductivity separation of the mixture enhanced. Lawver Patent 2,762,505 also refers to a specific conductivity separation of a mixture of particulate potassium chloride and sodium chloride which entails treatment of the particle surfaces with a combination of an alcohol and an amine.

The knowledge of the prior art concerning the utility of chemical pretreatment of particulate mixtures to enhance the selectivity of electrostatic separations is essentially empirical. The nature of the scientific phenomena involved is, in large measure undelineated, with the consequence that the specific known applications of chemical pretreatment do not suggest useful combinations of other mixtures or minerals and reagents. Moreover, prior art relative to the use of reagents in conductivity separations is of no assistance in respect to separations which depend primarily on phenomena other than conductivity such as contact electrification.

It is a primary object of this invention to provide an improved method for the electrostatic beneficiation of mixtures containing sodium and potassium halides and sulfates to provide potassium salt concentrates.

It is a specific object of the invention to provide a method for the electrostatic beneficiation of mixtures containing particulate sodium and potassium chloride to provide a potassium chloride concentrate.

It is an additional specific object of the invention to provide an improved method for the electrostatic beneficiation of potash ores, such as sylvinite ore.

It is an additional object of the invention to provide an improvement upon the processes described in Lawver Patent 2,805,768, the disclosure of which is incorporated herein by reference.

It is an additional object of the invention to provide a method pursuant to which the surfaces of at least a portion of the particles present in mixtures, including comminuted potash ores, containing particulate sodium halides or sulfates and potassium halides or sulfates are modified by chemical pretreatment with ammonia prior to charging and separation in an electrostatic field.

It is a particular object of the invention to provide a process for the electrostatic separation of particulate mixtures of sodium and potassium halides and sulfates which entails a novel procedure whereby the requisite differential charges on the potassium and sodium salt particles may be enhanced.

It is a more specific object of the invention to provide a mixture of particulate sodium and potassium halides and sulfates having at least a portion of the surfaces of said particles modified by treatment with ammonia, the charge differential between said sodium halide or sulfate and potassium halide or sulfate particles occasioned by the contact electrification thereof being substantially greater than that which would be obtained in the absence of said ammonia treatment.

It is a further object of the invention to provide an improved method for the electrostatic separation of particulate mixtures of sodium and potassium halides and sulfates in which no significant modification of the charge on said particles occurs in the electrostatic field in which separation is effected.

The invention generically embraces contacting a particulate mixture of salts selected from the group consisting of the sodium halides and sulfates and the potassium halides and sulfates with a material selected from the group consisting of liquid and gaseous ammonia to effect at least a surface modification of at least a portion of the particle surfaces, thereafter inducing the sodium and potassium salt particles to accept differential charges, and subjecting the differentially charged particle mixture to the action of an electrostatic field.

In accordance with a preferred embodiments of the invention, mixtures containing potassium halides or sulfates and sodium halides or sulfates are contacted with ammonia vaper, heated to a temperature of at least about 125° F., but below the melting point thereof, induced, while at a temperature of at least about 125° F. to accept differential charges and passed through an electrostatic field while at a temperature of at least about 125° F. Preferably a temperature of at least about 150° F. to 350° F. is observed in the heating charging, and electrostatic separation steps.

The invention is generically applicable to the electrostatic separation of all mixtures containing particulate sodium and potassium halides and sulfates. Representative materials include natural ores such as sylvinite ore, langbeinite ore, and mixed ores which are mixtures of magnesium sulfate-potassium sulfate complexes, natural salt mixtures formed, for example, by the evaporation of natural brines such as are found in Bonneville, Utah, and Searles Lake, California; sodium and potassium halide and sulfate mixtures produced by the evaporation of synthetically produced brines and artificial sodium and potassium halide and sulfate mixtures. The invention specifically contemplates mixtures of the various sodium sulfates and halides including the sodium chlorides, bromides, iodides and fluorides with like potassium salts. It will be appreciated that mixed salts which comprise one or more molecules of a sodium or potassium halide or sulfate in association with one or more molecules of another compound are sodium or potassium halides or sulfates within the contemplation of this invention. Typical of such salts are langbeinite $$K_2SO_4 \cdot 2MgSO_4$$

leonite $K_2SO_4 \cdot MgSO_4 \cdot 4H_2O$, and astrakainite $$Na_2SO_4 \cdot MgSO_4 \cdot 4H_2O$$

Certain natural potash ores such as sylvinite and langbeinite ores, contain slimes which adversely affect the electrostatic separation, as elucidated in Lawver Patent 2,805,768. Such slimes may either be substantially eliminated as by washing or inactivated by heat treatment to a temperature in excess of 600° F., but below the decomposition temperature of the ore. Accordingly, the invention, as applied to slime-bearing potash ores, preferably entails liberating the ore by comminution, contacting the liberated ore with a material selected from the group consisting of liquid and gaseous ammonia to effect modification of at least a portion of the ore particle surfaces, heating the liberated ore to a temperature in excess of about 600° F., but below the decomposition temperature thereof to inactivate the slimes, inducing the ore particles to accept differential charges and passing the charged particle mixture through an electrostatic field to produce a concentrate containing predominantly potash salts. It will be appreciated that the ammonia treatment may either precede or follow the slime inactivation step.

A more specific application of the invention to slime-bearing potash ores entails comminution of the ore to liberation, contacting the liberated ore particles with ammonia to effect modification of at least a portion of the ore particle surfaces, heating the liberated ore, either before or after said ammonia treatment, to a temperature in excess of about 600° F. and below the decomposition temperature thereof to inactivate said slimes, cooling the ore including the inactivated slimes to a temperature within the range of about 425° F. to about 100° F., inducing the ore particles to accept differential charges at a temperature in the range of about 425° F. to about 100° F., and passing the charged particle mixture through an electrostatic field to produce a concentrate containing predominantly potash salts.

The invention generically contemplates electrostatic fields of any strength requisite, as may readily be determined by a person skilled in the art, to effect the desired separation between the charged particles. Generally the field gradient or strength may vary from about 1,000 volts to about 15,000 volts per inch of distance between the electrodes. It is preferred to utilize a total applied potential difference of 30,000 to 250,000 volts maintained in a form of uniform potential substantially free of alternating components. Filtered direct current low in alternating current ripple is appropriately utilized. Rectified radio frequency power supplies are also appropriate.

In general, the particle size of the mixtures separated in accordance with the invention should fall within the range of from about 4 to about 200 mesh, preferably from about 8 to about 100 mesh. In general, in regard to ores, comminution to a commercially practical degree of liberation is suitable. Removal of fines may be desirable but is not essential.

It will be appreciated that the process of the invention is embracive of the electrostatic separation of ammonia treated sodium and potassium halide and sulfate mixtures in an electrostatic field without regard to the particular physical structure of the apparatus utilized. A preferred form of apparatus is of the "free-fall" type which comprises spaced stationary electrodes of opposite signs such as is disclosed, for example, in FIGURE 3 of Lawver Patent 2,805,767.

The process of the invention, however, may also be practiced in roll-type separators such as are disclosed in Johnson Patent 2,197,865, in which the electrodes take the form of a rotating, relatively large diameter roll by which the particles of the material to be separated are conveyed into the field, and a relatively smaller electrode spaced from the roll. Inasmuch as the materials of which the present invention is concerned are essentially nonconductors, the actual separation occurs in such roll separators in substantially the same way as in "free-fall" apparatus utilizing stationary electrodes. Such a result is a consequence of the fact that the nonconducting mineral particles are effectively charged substantially entirely by contact electrification rather than by inductive conduction from the roll surface of a roll separator as in the case of conductor particles. The invention accordingly embraces the separation of ammonia-treated mixtures of sodium and potassium halides and sulfates in "free-fall" stationary electrodes or roll-type apparatus.

The invention preferably is practiced under conditions which effect no significant change during passage through the electrostatic field in the charge on the particles undergoing separation. Hence, apparatus which utilizes an electron spray or other means to effect such charge change is preferably avoided.

The ammonia treatment contemplated by the invention is effected by contacting the particle surfaces with gaseous or liquid ammonia. The ammonia pretreatment may be effected at any desired temperature either before or after such heat treatment as may be applied in preparation for electrostatic separation. In the preferred practice of the invention, the particles are maintained in contact with gaseous or liquid ammonia for a period of from about 10 seconds to about 30 minutes and at a temperature in the range of about 50° F. to a temperature not in excess of the decomposition temperature of the salt mixture. Decomposition of the ammonia salts, desorption, dehydration and the like as distinguished from actual decomposition of the halide or sulfate salt per se may, within the scope of the invention, occur at elevated temperatures utilized in either the ammonia treatment, slime inactivation or charging steps. Maintenance of the ammonia in contact with the salt particles for extended periods of time does not adversely affect the process. It is expedient to carry out the desired reaction between the salt particle surfaces and ammonia gas by passing the gas through a bed or falling stream of the preferably preheated sodium and potassium salt particle mixture.

Examination of the sodium and potassium chloride or sulfate mixtures before and after treatment with ammonia reveals that a significant number of initial translucent or semi-translucent particles are altered as evidenced by a chalk-white appearance. Moreover, pressure readings taken when the ammonia gas is introduced into a partially evacuated chamber containing comminuted potash ore show a drop after the initial rise caused by the introduction of the gas, indicating that the ammonia is reacting chemically with the ore or is being absorbed by it. In any event, modification of the ore surface occurs. The extent of such modification is a function of the quantity, pressure, temperature and time of ammonia supply.

It has been unexpectedly discovered that the components of sylvinite ore, other than clays, subsequent to ammonia treatment, demonstrate abnormal electrostatic behavior, with the result that the potassium chloride or sylvite compounds and the sulfates present report to the negative electrode, whereas the sodium chloride or halite reports to the positive electrode, rather than conversely as in the absence of such treatment.

The ensuing example is illustrative of the best mode presently known for the practice of the invention.

*Example*

1,000 parts of sylvinite ore comminuted to a mesh size of from about 14 mesh to about 35 mesh was placed in a reaction vessel. Ammonia gas at a temperature of about 70° F. was passed through the ore contained in the reaction vessel while the ore was at room temperature of about 70° F. for about 30 minutes. The ammonia-treated ore was then heated to about 550° F., cooled to about 250° F. and passed over a syntron vibrating feeder as freely falling bodies into an electrostatic field created by a 90,000 volt potential difference between stationary aluminum electrodes about six feet long spaced one foot apart. The temperature ambient in the separating zone was 180° F. The sylvite (potassium chloride) and sulfates reported toward the negative electrode, whereas the halite (sodium chloride) reported toward the positive electrode. The results are recorded in the following table.

| Electrode Polarity | Percent Wgt. | Percent $K_2O$ | Percent $SO_4$ | Percent insol. |
|---|---|---|---|---|
| Positive | 24.0 | 6.4 | 1.8 | 2.3 |
|  | 23.4 | 11.0 | 3.9 | 1.4 |
|  | 29.7 | 19.0 | 8.6 | 1.0 |
|  | 11.4 | 28.0 | 10.0 | 0.8 |
| Negative | 11.5 | 34.1 | 12.9 | 1.2 |

Analogous results are obtained under like conditions from each of the various sodium and potassium halide and sulfate mixtures contemplated.

We claim:

1. The process which comprises contacting a mixture of particulate sodium salts and potassium salts selected from the group consisting of the sodium halides and sulfates and the potassium halides and sulfates with a material selected from the group consisting of liquid and gaseous ammonia to effect at least a surface modification of at least a portion of the surfaces of the salt particles present in said mixture thereafter inducing said particles to accept differential charges by contact electrification and subjecting the differentially charged particle mixture to the action of an electrostatic field.

2. The process of claim 1 wherein said mixture of sodium and potassium salt particles is heated to a temperature in excess of about 125° F. but below the melting point thereof, said particles are induced while at a temperature of at least about 125° F. to accept differential charges and passed through an electrostatic field at a temperature of at least about 125° F.

3. The process of claim 2 wherein the salt particles in said mixture are heated, differentially charged, and passed through an electrostatic field at a temperature of at least about 150° F.

4. The process of claim 2 wherein the salt particles in said mixture are heated, differentially charged and passed through an electrostatic field at a temperature of at least about 350° F.

5. The process of claim 1 wherein said salt mixture is a comminuted natural ore.

6. The process of claim 5 wherein said ore is sylvinite ore.

7. The process of claim 1 wherein said electrostatic field is established between a rotatable conveyor roll and an electrode spaced from said conveyor roll.

8. The process of claim 1 wherein said charged particle mixture is passed, without significant charge modification as freely falling bodies through said electrostatic field established between stationary electrodes.

9. The process of claim 1 wherein said salt particle mixture is maintained in contact with said material for a time period from about 10 seconds to about 30 minutes at a temperature in the range of about 50° F. to a temperature not in excess of the decomposition temperature of a component of said mixture.

10. The process which comprises comminuting to liberation at a mesh size between about 4 and about 200 mesh a slime-bearing potash ore to provide a particulate slime-containing mixture of particulate sodium salts and particulate potassium salts selected from the group consisting of the sodium halides and sulfates and the potassium halides and sulfates, contacting the liberated ore with a material selected from the group consisting of liquid and gaseous ammonia to effect modification of at least a portion of the ore particle surfaces, heating the liberated ore to a temperature in excess of about 600° F. but below the decomposition temperature thereof to inactivate the slimes, inducing the ore particles to accept differential charges by contact electrification, and passing the differentially charged ore particle mixture through an electrostatic field to produce a concentrate containing predominantly potash salts.

11. The process of claim 10 wherein said liberated ore is contacted with said material prior to slime inactivation.

12. The process of claim 10 wherein said liberated ore is contacted with said material subsequent to slime inactivation.

13. The process of claim 10 wherein said ore is sylvinite ore.

14. The process of claim 10 wherein said ore is langbeinite ore.

15. The process of claim 10 wherein the slimes in said liberated ore are inactivated, and the liberated ore is thereafter, cooled to a temperature within the range of about 425° F. to about 100° F., and the liberated ore particles are induced to accept differential charges at a temperature in the range of about 425° F. to about 100° F. and passed through an electrostatic field while at a temperature in excess of about 100° F.

16. The process of claim 10 wherein said ore is comminuted to liberation at a mesh size within the range of from about 8 to about 100 mesh.

17. The process of claim 10 wherein said material is gaseous ammonia.

18. The process of claim 10 wherein said material is liquid ammonia.

References Cited in the file of this patent

UNITED STATES PATENTS

| 2,556,483 | Perry | June 10, 1951 |
| 2,805,768 | Lawver | Sept. 10, 1957 |

OTHER REFERENCES

United States Bureau of Mines, R.I. 3667, "Contact Potential in Electrostatic Separation," November 1942, pages 5–7 and 12.